(12) United States Patent
Narayan et al.

(10) Patent No.: US 12,175,786 B2
(45) Date of Patent: Dec. 24, 2024

(54) SYSTEMS, METHODS, AND DEVICES FOR AUTOMATICALLY CONVERTING EXPLANATION OF BENEFITS (EOB) PRINTABLE DOCUMENTS INTO ELECTRONIC FORMAT USING ARTIFICIAL INTELLIGENCE TECHNIQUES

(71) Applicant: Data-Core Systems, Inc., Philadelphia, PA (US)

(72) Inventors: Anshuman Narayan, Bristol, PA (US); Jishnu Bhattacharyya, Philadelphia, PA (US); Dhrubajyoti Chakravarty, Philadelphia, PA (US); Pradeep K. Banerjee, Bristol, PA (US); Sin-Min Chang, Shelton, CT (US)

(73) Assignee: Data-Core Systems, Inc., Philadelphia, PA (US)

( * ) Notice: Subject to any disclaimer, the term of this patent is extended or adjusted under 35 U.S.C. 154(b) by 354 days.

(21) Appl. No.: 17/728,928

(22) Filed: Apr. 25, 2022

(65) Prior Publication Data
US 2023/0053464 A1  Feb. 23, 2023

Related U.S. Application Data

(60) Provisional application No. 63/234,774, filed on Aug. 19, 2021.

(51) Int. Cl.
*G06V 10/00* (2022.01)
*G06F 40/174* (2020.01)
(Continued)

(52) U.S. Cl.
CPC .......... *G06V 30/413* (2022.01); *G06F 40/174* (2020.01); *G06V 10/82* (2022.01);
(Continued)

(58) Field of Classification Search
CPC ............ G06N 3/08; G06N 3/02; G06N 3/042; G06N 3/045; G06N 3/047; G06N 3/049;
(Continued)

(56) References Cited

U.S. PATENT DOCUMENTS 9,767,381 B2 *  9/2017  Rodr?guez-Serrano ..................... G06N 3/04
10,423,827 B1 *  9/2019  Wu ......................... G06V 20/70
(Continued)

OTHER PUBLICATIONS

Jansons, Girts, "CA2427468A1 Method of producing a database having input from a scanned document"; Publication Date: Nov. 2, 2004.*

*Primary Examiner* — Amir Alavi
(74) *Attorney, Agent, or Firm* — Akerman LLP

(57) ABSTRACT

Embodiments for automatically converting printed documents into electronic format using artificial intelligence techniques disclosed herein include: (i) receiving a plurality of images of documents; (ii) for each received image, using an image classification algorithm to classify the image as one of (a) an image of a first type of document, or (b) an image of a second type of document; (iii) for each image classified as an image of the first type of document, using an object localization algorithm to identity an area of interest in the image; (iv) for an identified area of interest, using an optical character recognition algorithm to extract text from the identified area of interest; and (v) populating a record associated with the document with the extracted text.

20 Claims, 15 Drawing Sheets

(51) Int. Cl.
*G06V 10/82* (2022.01)
*G06V 30/14* (2022.01)
*G06V 30/18* (2022.01)
*G06V 30/19* (2022.01)
*G06V 30/413* (2022.01)

(52) U.S. Cl.
CPC .......... *G06V 30/1444* (2022.01); *G06V 30/18* (2022.01); *G06V 30/19093* (2022.01)

(58) Field of Classification Search
CPC ........ G06N 3/082; G06N 3/092; G06N 3/088; G06N 3/0454; G06N 3/464; G06N 3/0475; G06N 30/412; G06N 30/418; G06N 30/19013; G06V 30/413; G06V 30/418; G06V 30/18; G06V 30/1444; G06V 30/19093; G06V 10/82; G06F 40/174
See application file for complete search history.

(56) References Cited

U.S. PATENT DOCUMENTS

| | | | | |
|---|---|---|---|---|
| 10,521,691 | B2 * | 12/2019 | Najibikohnehshahri | .................... G06T 7/11 |
| 10,621,747 | B2 * | 4/2020 | Malisiewicz | ........... G06N 3/044 |
| 10,719,951 | B2 * | 7/2020 | Kaehler | .................. G06F 3/011 |
| 10,860,898 | B2 * | 12/2020 | Yang | .................... G06F 18/2415 |
| 10,922,393 | B2 * | 2/2021 | Spizhevoy | ............ G06V 40/197 |
| 10,922,583 | B2 * | 2/2021 | Kaehler | .................. G06F 3/017 |
| 11,734,570 | B1 * | 8/2023 | Kurz | ......................... G06F 9/48 706/25 |
| 11,914,674 | B2 * | 2/2024 | Zadeh | .................... G06N 3/084 |
| 11,915,463 | B2 * | 2/2024 | Savvides | .................... G06V 20/52 |
| 2023/0053464 | A1 * | 2/2023 | Narayan | ............... G06V 30/412 |

* cited by examiner

Figure 1(a)

SYSTEMS, METHODS, AND DEVICES FOR AUTOMATICALLY CONVERTING EXPLANATION OF BENEFITS (EOB) PRINTABLE DOCUMENTS INTO ELECTRONIC FORMAT USING ARTIFICIAL INTELLIGENCE TECHNIQUES

CROSS-REFERENCE TO RELATED APPLICATIONS

The present application claims priority to U.S. Provisional Application 63/234,774 titled "Systems and Methods for Automatically Converting Explanation of Benefits (EOB) Printable Documents into Electronic Format using Artificial Intelligence Techniques," filed on Aug. 19, 2021. The entire contents of App. 63/234,774 are incorporated by reference herein.

USAGE AND TERMINOLOGY

In this disclosure, unless otherwise specified and/or unless the particular context clearly dictates otherwise, the terms "a" or "an" mean at least one, and the term "the" means at least one.

SUMMARY

The present application discloses and describes systems and methods to convert printed Explanation of Benefit (EOB) documents into its representative EDI 835 transaction set, sometimes called Health Care Claim Payment and Remittance Advice.

The Health Insurance Portability and Accountability Act of 1996 (HIPAA or the Kennedy-Kassebaum Act) is a United States federal statute enacted by the 104th United States Congress and signed into law by President Bill Clinton on Aug. 21, 1996. It was created primarily to modernize the flow of healthcare information, stipulate how personally identifiable information maintained by the healthcare and healthcare insurance industries should be protected from fraud and theft, and address limitations on healthcare insurance coverage.

HIPAA required Department of Health and Human Services (HHS) to establish national standards for electronic transactions to improve the efficiency and effectiveness of the nation's health care system. Healthcare providers and their business associates who accept payment from any health plan or other insurance company must comply with HIPAA if they conduct the adopted transactions electronically.

Electronic Data Interchange (EDI) is a method of automated transfer of data between a care provider like a hospital and an insurance company (payer). The use of EDI allows payers and care providers to send and receive information faster and often at a lower cost. The EDI 837 transaction set is the format established to meet HIPAA requirements for the electronic submission of healthcare claim information. The claim information, for a single care encounter between a patient and a care provider, provides a description of the patient, the patient's condition for which treatment was provided, the services the care provider provided, and the cost of the treatment. These transactions may be exchanged directly between the care provider and the payer either directly or indirectly via clearinghouses. For professional, institutional, and dental providers, the EDI 837 transaction set provides a mechanism to submit information regarding electronic health care encounters and claims. Health insurers and other payers send their payments and explanation of benefits information back to care providers via the EDI 835 transaction set. The EDI 835 transaction set is utilized by a payer to send electronic remittance advice (ERA) or electronic explanation of payment (EOP) to a requesting care provider. Both EDI 837 and EDI 835 conform to ASC X12N Version 5010 Standard. While there are several advantages to using the EDI 837 and EDI 835 transaction sets to exchange claims information, ERA, EOP, and other payment information, for practical reasons some payers and insurers still send payment via paper checks and paper-based Explanation of Benefits (EOB) documents instead of using the EDI 835 transaction set.

Explanation of Benefits (EOB) documents are typically received through regular mail room operations usually received in physical paper envelopes. The mail room workers generally do not know the contents of each envelope; they just forward the envelopes to the responsible department. Once the envelopes are opened by the responsible department, the staff of the receiving department must process the received materials according to their contents in a traditional manual operation workflow. This manual operation workflow includes identifying the contents of the received materials and keying-in corresponding data into a patient accounting system. These manual procedures are time consuming and error prone. In this disclosure, a novel approach is presented to automate aspects of this manual procedure.

The conversion of a digital scanned images to data, by itself, presents a set of challenges and EOB documents, by their very nature, add several levels to the conversion challenge:

For example, first, the basic technique used to extract data from the image is Optical Character Recognition (OCR). However, the accuracy of the data is totally dependent on the quality of the scanned image—as well as the resolution, alignment, scaling, and noise that creep in during the scanning process. Pre-processing of the digital image often improves the data extraction accuracy.

Second, EOB documents are not standardized. There are hundreds of different types of EOBs, and they all look different with different formats where the relevant data is located in different locations of the differently-formatted EOBs. Sometimes EOBs from the same payer can even differ. The EOBs, therefore, must be classified into different types to facilitate efficient processing.

Third, because of the non-standard nature of EOBs, it is often difficult to identify where a specific data element is located in an EOB. Hence data elements must be localized within a given type of EOB.

Fourth, data elements are often referred to by different names in different types of EOBs even though the differently-named data elements mean the same thing and/or correspond to the same type of data. Hence the extracted data must be interpreted within its context.

And fifth, all the data elements that are required to generate a standard EDI 835 may not be present in some EOB types. So, to supplement the data contained in the EOB to generate the 835 transaction data, alternative methods of gathering the data must be implemented to bridge the gap between the data provided in the EOB and the data required to generate the 835 transaction data.

There are some solutions available in the marketplace today that extract data from EOB images and convert the same into an EDI 835 data stream. However, the approach of these solutions involves manually identifying the location of each data element within an EOB document, performing OCR on the full document, and finally using an extensive set of rules to determine the proper mapping of these data elements to the EDI 835 standard data format. Such solutions, consequently, require a complicated and painstaking initial setup process for each type of EOB document and continuous manual interventions to make adjustments and corrections during the conversion process. This disclosure presents a novel and innovative approach that improves upon current manual and automated processes in part by converting printed paper documents into an EDI 835 data stream that is faster than existing manual approaches, and more computationally efficient, easier to configure, and more accurate than existing automated approaches by using artificial intelligence techniques.

BRIEF DESCRIPTION OF THE DRAWINGS

FIG. 1(a) shows an example of EOB document used in some embodiments.

FIG. 4(b) shows an example of the labeling of two categories of bands: Target Band and Reference Band according to some embodiments.

DETAILED DESCRIPTION OF THE DRAWINGS

Figure 1A:
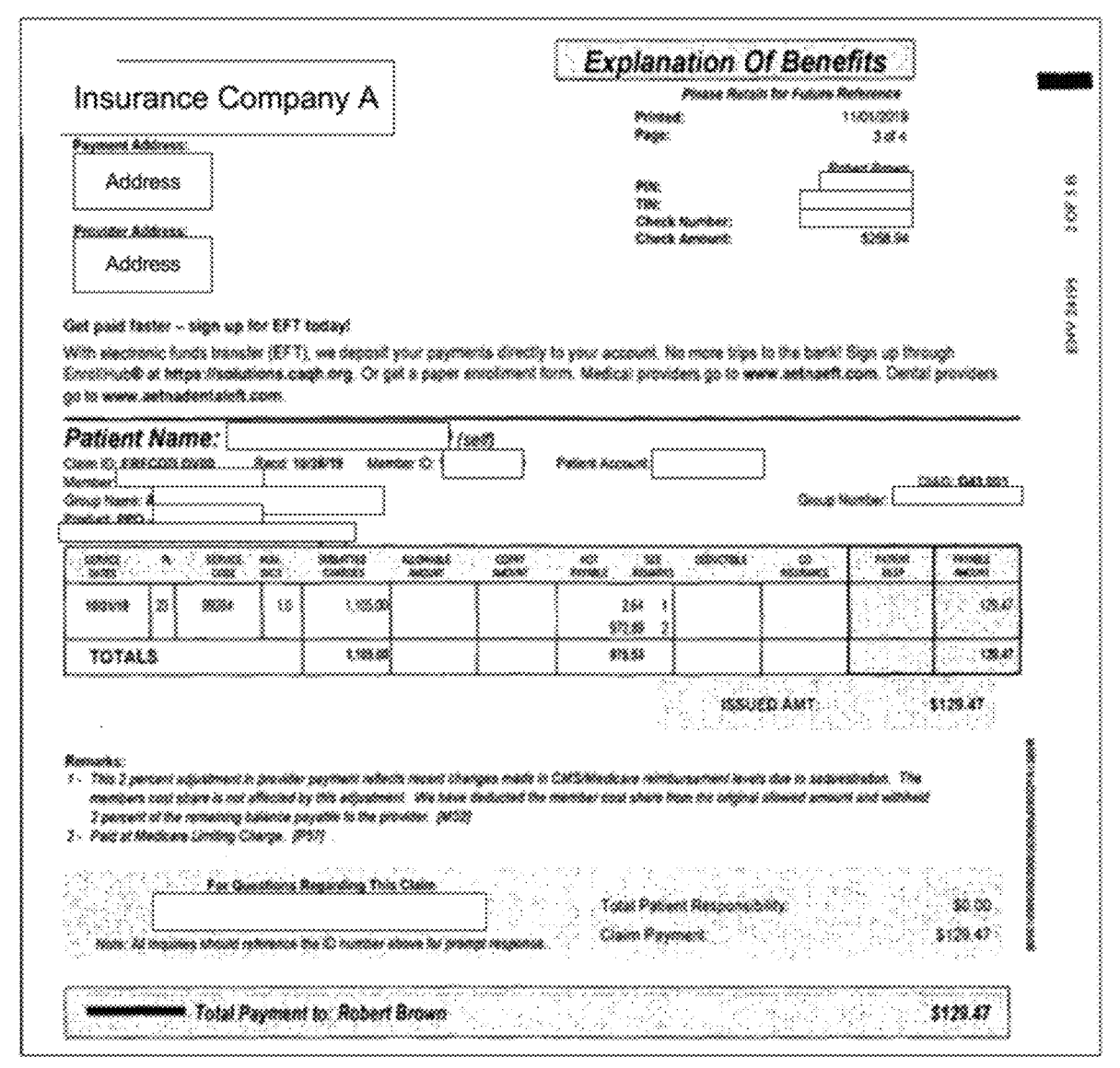

Explanation of Benefits (EOB) documents are typically received through regular mail room operations: they are typically delivered in envelopes. The mail room workers often do not know the contents of each envelope; they just forward the envelopes to the responsible department. Once the envelopes are opened by the responsible department, the staff members of the receiving department must process the received materials according to their contents in a traditional manual operation workflow. This manual operation workflow includes identifying contents of the materials and keying-in corresponding data into an accounting system according to the contents. An example of EOB is shown in FIG. 1(a). The manual processes are time consuming and error prone.

Figure 1B:
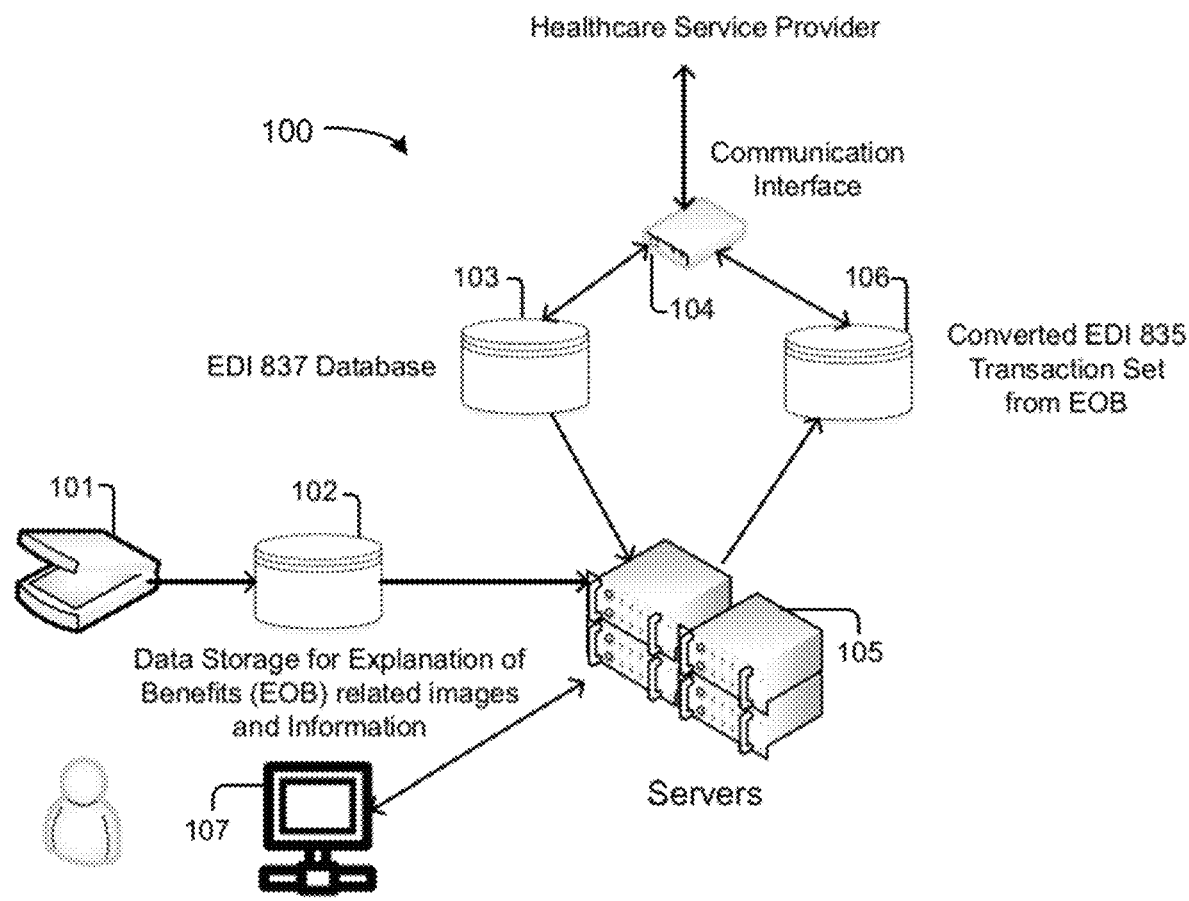
FIG. 1(b) shows an example system to automatically convert explanation of benefits printable document into electronic format using artificial intelligence techniques according to some embodiments.

FIG. 1(b) shows a system 100 to replace the manual operations described above by using scanners, computing server elements, storage elements and one or more communication interfaces. In operation, the scanner 101 scans the contents of EOB documents as images and store the images and related metadata including the number of pages and the location of the images into a database 102.

As mentioned in the summary, the EDI 837 transaction set is the format established to meet HIPAA requirements for the electronic submission of healthcare claim information. The claim information, for a single care encounter between patient and care provider, provides a description of the patient, the patient's condition for which treatment was provided, the services provided by the care provider, and the cost of the treatment. In this context, the EDI-837 transaction sets are provided by the service providers or hospitals via the communication interface 104 and then stored in a database 103.

Figure 2:
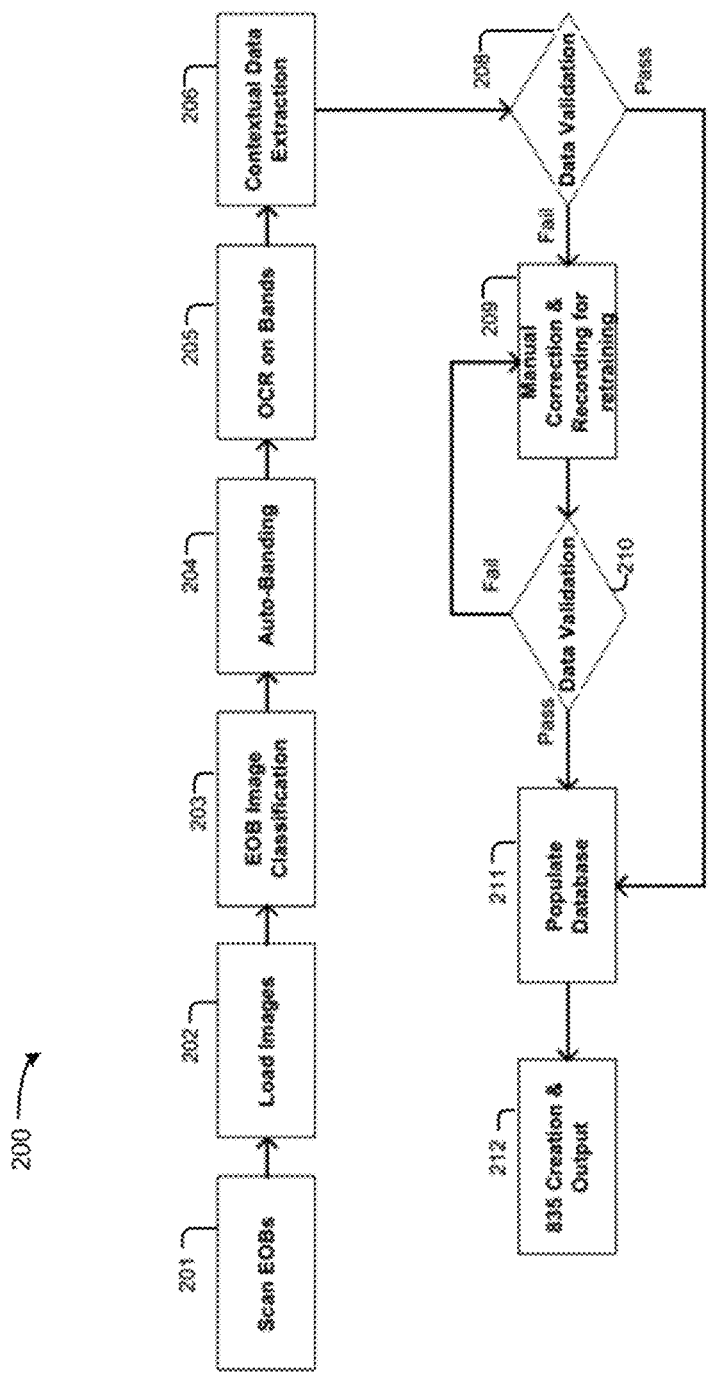
FIG. 2 shows an example flow diagram to automatically convert explanation of benefits printable document into electronic format using artificial intelligence techniques according to some embodiments.
Figure 7:
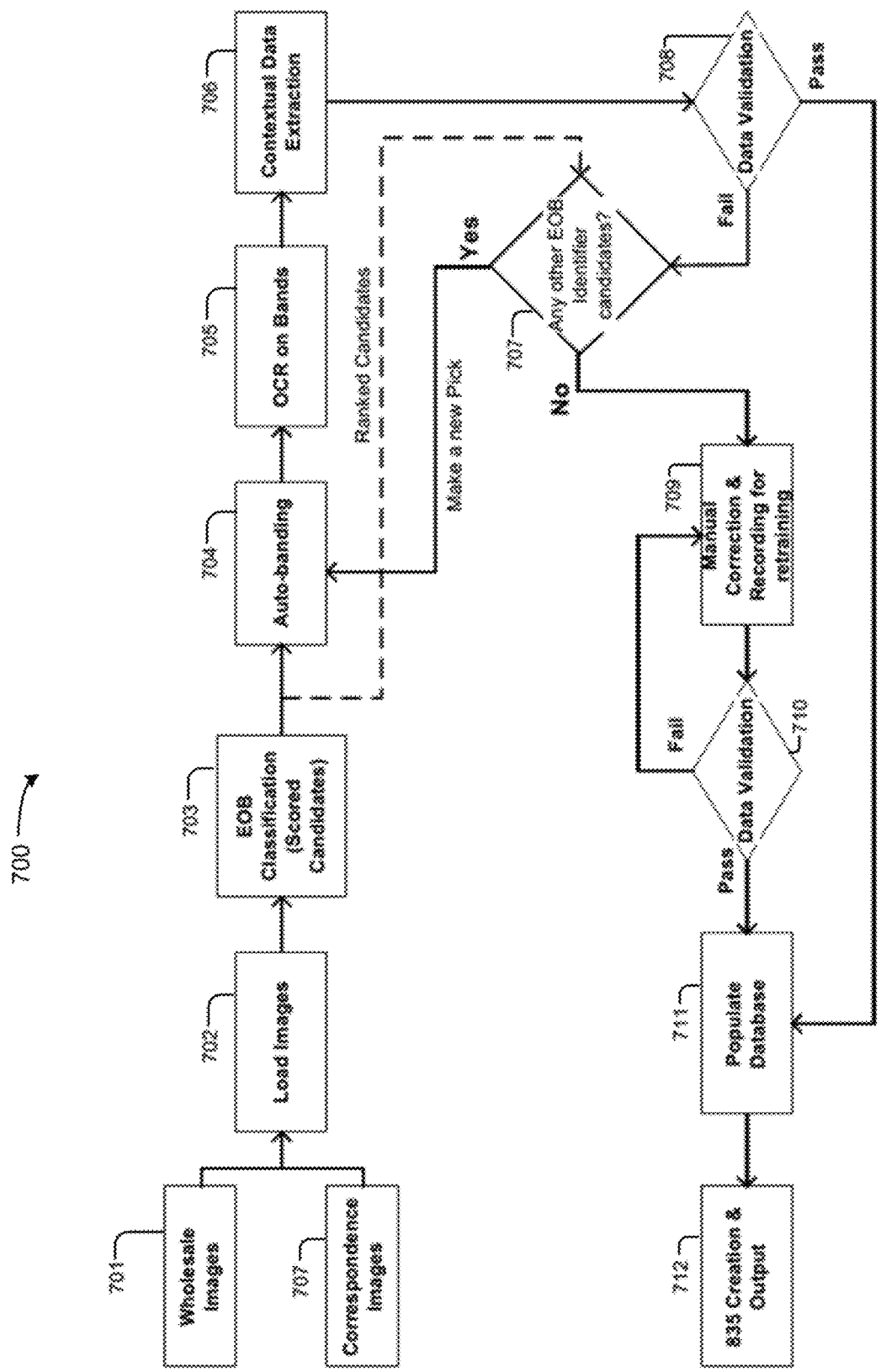
FIG. 7 shows aspect of an example improved flow diagram to automatically convert explanation of benefits printable document into electronic format using artificial intelligence techniques according to some embodiments.

The computing servers 105 process information from databases 102 and 103 according to a workflow described in FIG. 2 and/or FIG. 7. The resulting EDI-835 transaction sets are stored in an EDI-835 database 106 before they are transferred to the service providers via the communication interface 104. The operators can operate the scanner 101 and perform manual operations via terminal 107 when needed.

FIG. 2 shows a workflow 200 to convert EOB documents into EDI-835 transaction sets according to some embodiments. As illustrated in block 201, once the EOB images and their metadata are stored in the storage at block 201, workflow block 202 includes loading the related information and images into the server so that they become accessible to the server. Block 203 includes identifying whether the set of images and their corresponding metadata truly represent an EOB document; block 203 also include identifying which payer a particular EOB document comes from, such as identifying that an EOB is indeed from Blue Cross and Blue Shield for example. Once an EOB is identified from a specific payer at block 203, block 204 includes identifying specific regions where the EOB information is actually located so that the identified region or regions are cropped from the image for further processing using Optical Character Recognition (OCR) techniques in block 205. Once characters and their locations are identified at block 205, block 206 includes extracting words, phrases and their meanings according to their context. This extraction based on context at block 206 is described further with reference to FIG. 5. Once the contents are extracted at block 206, block 208 includes validating the extracted contents using the EDI-837 information already available from the service provider or hospital. This validation process at block 208 reconciles the extracted data with the EDI-837, which the hospital or service provider previously submitted to the payer to verify that the EOB truly represents a response for the submitted claims. At block 208, if the process fails to verify the relationship between the EOB and an EDI-837 transaction set, the process includes storing the EOB images and/or extracted data for manual processing, such as manually entering the data into the database (e.g., one or more of databases 102, 103, and/or 106) at block 209. In some embodiments, the images stored during execution of block 209 are added to a candidate data set to be used for the future retraining of the classification models used in blocks 203 and 204 to improve the performance and accuracy of the classification models. Once the manual operation is verified at block 210 using the same (or similar) validation process as in block 208, block 211 includes adding the extracted data to the database for EDI-835. Next, block 212 includes creating an EDI-835 record compliant with the ANSI X-12 standards, and marking or otherwise indicating the newly created EDI-835 record as ready to be transmitted to the service provider or the hospital.

Figure 3A:
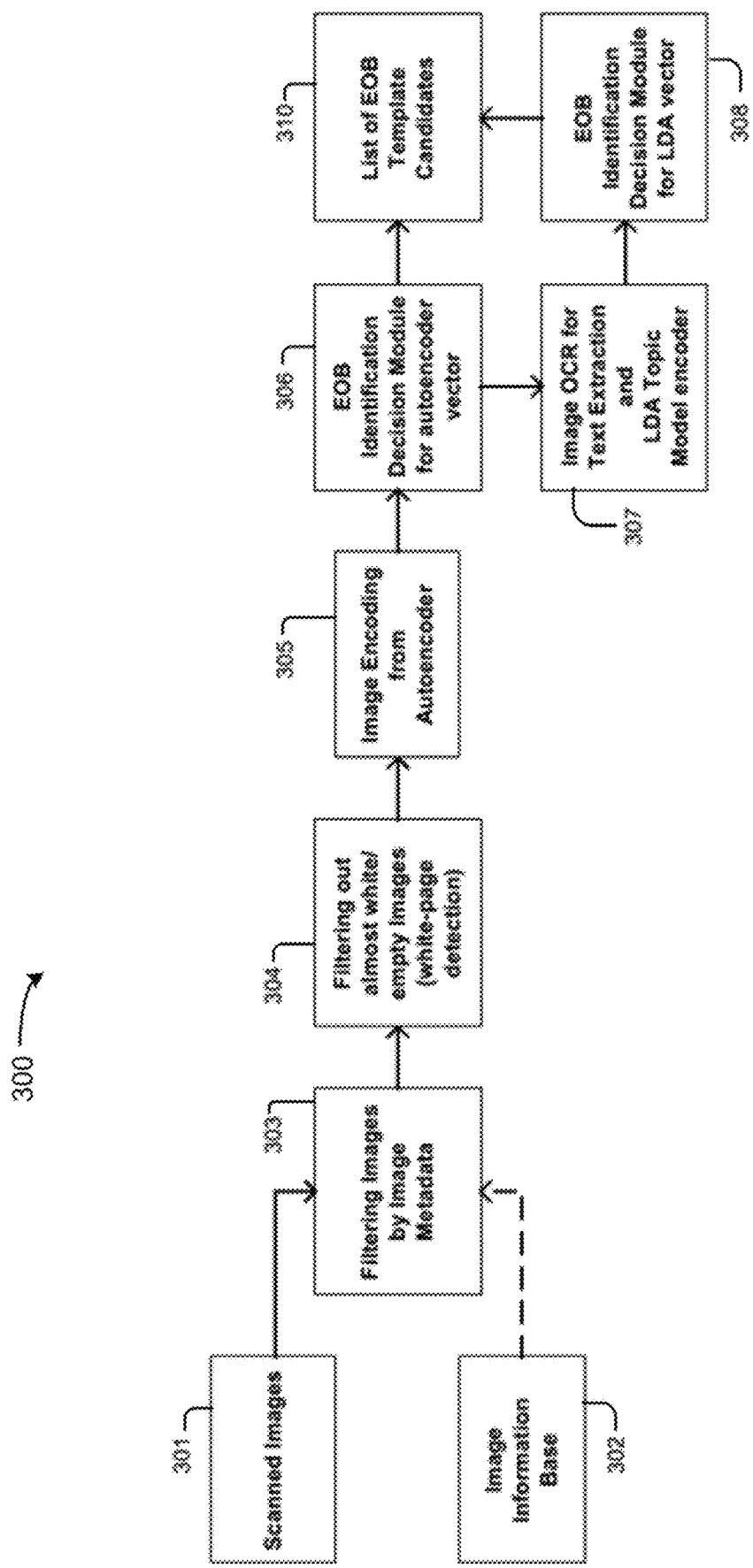
FIG. 3(a) shows an example flow diagram for image classification to identity EOB and its type according to some embodiments.

FIG. 3(a) illustrates an EOB classification process 300 to identify whether a scanned document is an EOB document, and if so, which insurance company (i.e., which payer) the EOB document corresponds to. Block 301 represents an organized database images. Some images in the database are irregular and some images are larger/smaller than others. Block 302 represents an image information base that contains metadata associated with corresponding images stored in the organized database of images depicted at block 301, such as each image's respective business information like the date of scanning, including which batch and which envelope the scanned document came from. Block 303 includes removing images that are not of interest; for example, the image of the physical envelope which contained this processed document can be removed based on the known information from the database. Block 304 includes removing images with large empty spaces. The processes at block 303 and 304 reduces the total data that needs to be stored for processing, and reduces the amount of data that needs to be processed at the subsequent processing stages as compared to some prior approaches.

Block 305 includes encoding the image into a large-dimensional vector (e.g., a thousand-plus-dimensional vector) using a pre-trained Encoder based on autoencoder approach.

Figure 3B:
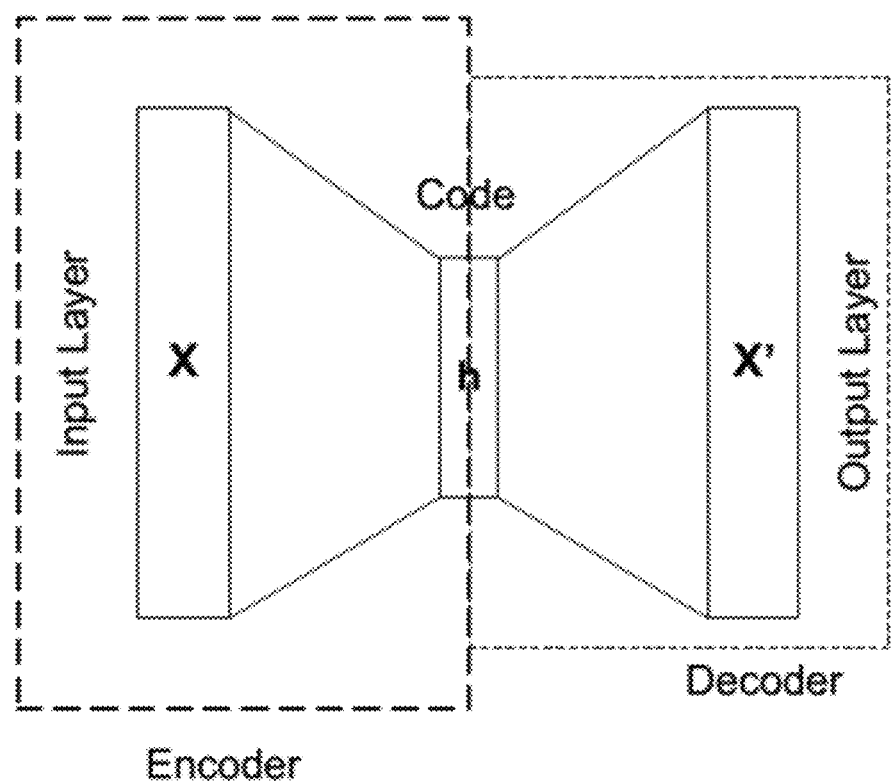
FIG. 3(b) shows an example of an autoencoder architecture suitable for use in some embodiments.

An autoencoder is a type of artificial neural network used to learn efficient coding of unlabeled data (unsupervised learning). An autoencoder architecture diagram suitable for use with the embodiments disclosed herein is shown in FIG. 3(b). In operation, the encoding is validated and refined by attempting to regenerate the input from the encoding. The autoencoder learns a representation (encoding) for a set of data, typically for dimensionality reduction, by training the network to ignore insignificant data ("noise"). Using an autoencoder in this manner to reduce the dimensionality of the data for processing enables more computationally efficient processing of the extracted data as compared to some prior approaches.

In some embodiments, the autoencoder implemented in connection with block 305 is trained using a set of images comprising EOB images from all payers and a set of non-EOB images. The training sets are selected carefully so that they are representative of the various different types of EOBs that the system is expected to encounter. For example, in some embodiments, the autoencoder is implemented using of an encoder of 7 layers of 2-dimensional convolutional layer and a decoder of 7 layers of 2-dimensional convolutional transpose layer. In operation, such an implementation could result in an encoder that produces a representative vector of 2048 dimensions, for example.

Block 306 includes deciding whether an image is an EOB image or a non-EOB image using classification methods described below. Further, for images classified as an EOB image, block 306 additionally includes classifying the EOB images as corresponding to a particular payer. In some embodiments, the classification procedures at block 306 use a set of vectors encoded with the typical EOB documents from a particular payer using the pre-trained encoder of the above mentioned autoencoder. For example, in implementation scenarios where the system must classify each EOB as corresponding to one of twelve different payers, block 306 should already have twelve representative vectors from the autoencoder using their most representative EOB image(s). Likewise, some embodiments also include vectors for non-EOB images from different payers such that the classification procedures at block 306 can more accurately classify non-EOB documents as such, too.

In operation, the vector generated at block 305 for a particular image is compared with the above mentioned provisioned representative vectors in block 306, thus creating a set of scores. In some embodiments, these scores are Cosine Similarity scores. Alternatively, these scores can be calculated using other metric distances including Euclidean distance or Kullback-Leibler (K-L) divergence, which implies the the longer metric distance, the lower would be the score. After generating the scores comparing each image's vector with the vectors corresponding to each payer, the system classifies the EOB image as corresponding to the payer having the highest score. For example, if the score of the comparison between the vector of the EOB image and the representative vector for Payer A is the highest of scores, then the EOB image is classified or identified as an EOB corresponding to Payer A. As known in the art, Cosine Similarity is a measure of similarity between two non-zero vectors of an inner product space. Intuitively, cosine similarity represents the angular relationship of two representative vectors in the space while metric distance represents the location difference.

Figure 3C:
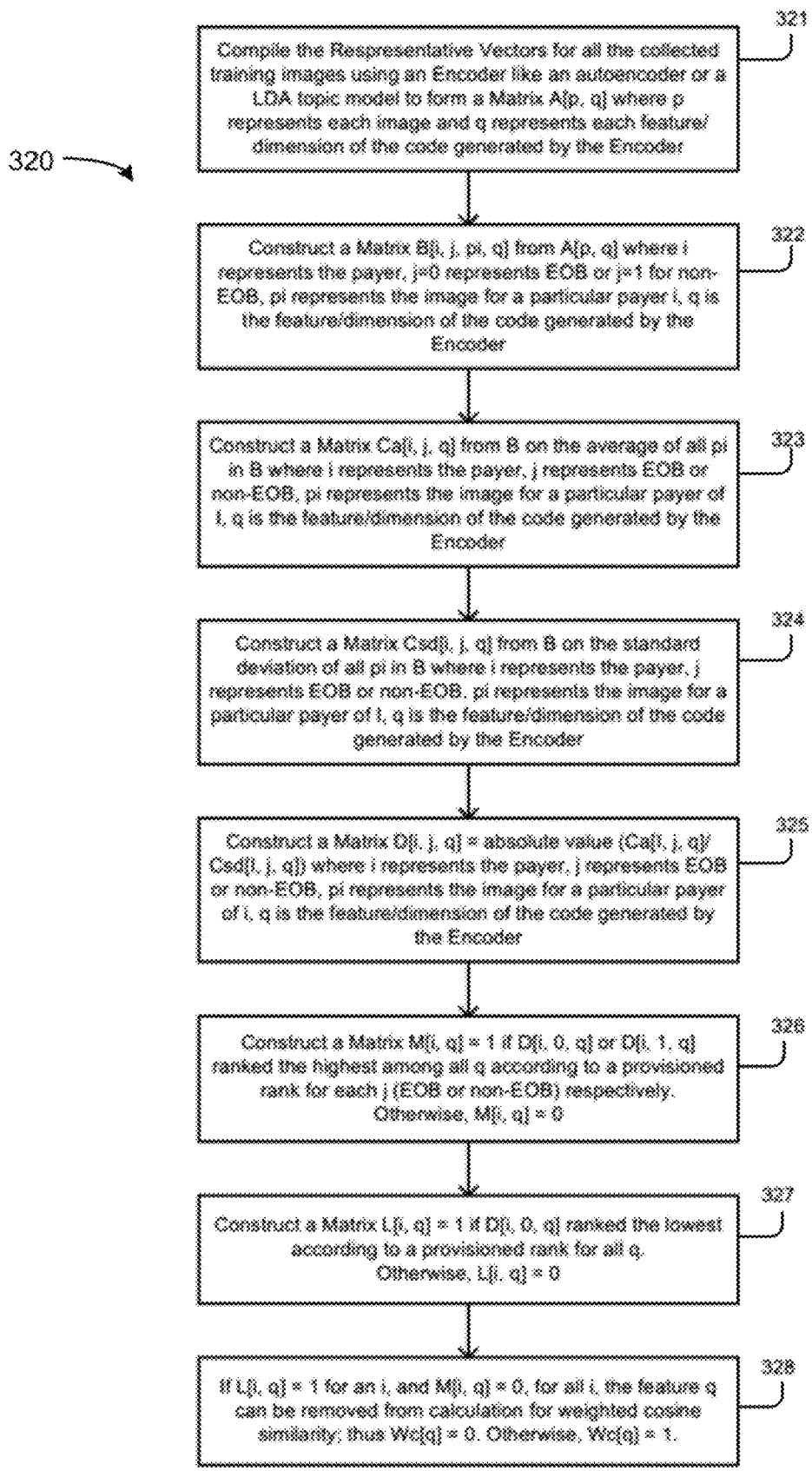
FIG. 3(c) shows an example process to identify the features to be included or excluded during the calculation of cosine similarity according to some embodiments.
Figure 3D:
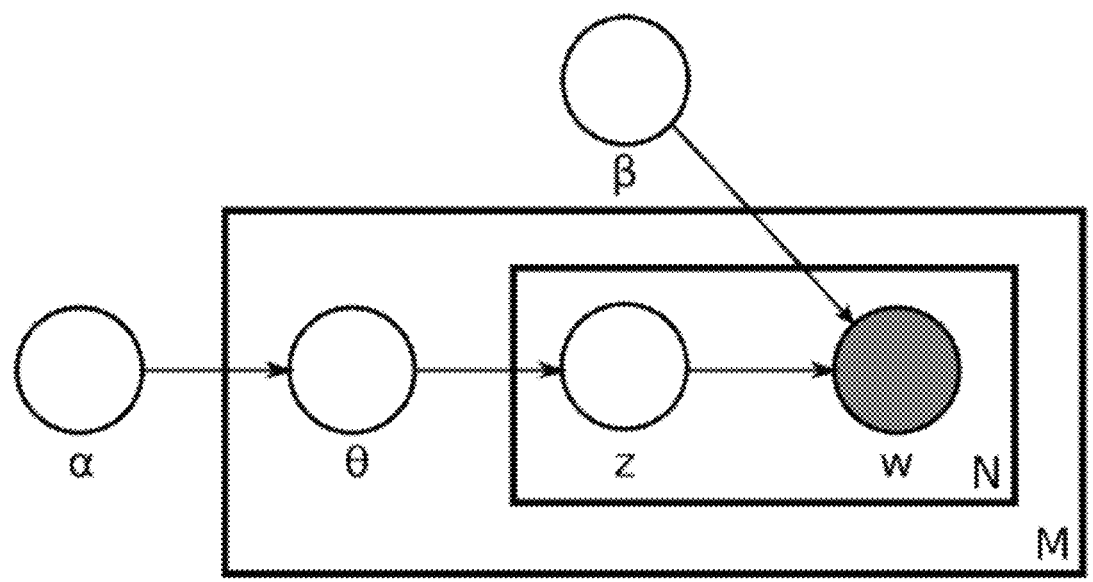
FIG. 3(d) shows an example of a typical plate notation representing the Latent Dirichlet Allocation (LDA) model suitable for use in some embodiments.

Further, a weighted cosine similarity is developed to include a weight for each dimension when calculating the cosine similarity as shown in FIG. 3(c). Some dimensions are identified to be less significant; thus, they can be removed from the score calculation or associated with a weight of zero. The EOB images for training from one payer has its own representative vector; likewise, each non-EOB images from that payer also has its own representative vector produced by using the pre-trained encoder. The dimensions which rank the smallest mean to standard deviation ratio based of the representative vectors of each payer's EOB can be removed from the cosine similarity check to reduce the computational complexity of the classification process. An example process is shown in FIG. 3(c).

Further, when an image is identified to be an EOB of a particular payer in block 306, the process advances to block 310. When the image cannot be identified as an EOB, the process instead advances to block 307.

Block 307 and 308 including giving an image which has already been identified as non-EOB at block 306 a second analysis based on the context of the text contained in the image. Block 307 includes first converting the image into a text document using OCR, and then producing a topic vector from the text extracted from the image using an LDA Topic Model. In some embodiments, the Topic Model implemented at block 307 is trained using the text of the entire set of training images including all the EOB and non-EOB images to train the autoencoder implemented at block 305.

In natural language processing, the Latent Dirichlet Allocation (LDA) is a generative statistical model that allows sets of observations to be explained by unobserved groups that explain why some parts of the data are similar. For example, if observations are words collected into documents, the LDA model posits that each document is a mixture of a small number of topics and that each word's presence is attributable to one of the document's topics. LDA is an example of a topic model within the machine learning and artificial intelligence fields.

Any EOB document text or non-EOB document text from a particular payer should contain a unique signature represented by the value distribution across the entries of each topic spaces. Thus, in operation, the Topic Model implemented at block 307 should be able to produce topic vectors for any phrase or keyword as well as for the entire text extracted from an image.

Block 308 includes classifying the topic vector from block 307 to determine whether an image is an EOB or not and EOB. And for images classified as an EOB, block 307 further includes classifying the EOB as corresponding to a particular payer. The classification procedure at block 308 uses a set of vectors encoded with the typical EOB documents from a particular payer using the pre-trained LDA Topic Model. For example, in a scenario where there are twelve different payers, block 307 should already have twelve representative vectors from the LDA Topic Model for each payer's most representative EOB document. Likewise, there are vectors for documents converted from non-EOB images from different payers provisioned in block 308. When the topic vector from block 307 has the shortest metric distance with a particular payer's EOB representative topic vector, it is identified as an EOB corresponding to that particular payer.

FIG. 3(c) shows an example process of the weight assignment algorithm used in some embodiments of the process implemented at block 306 of FIG. 3(a) when a Weighted Cosine Similarity approach is used. The dimensions which rank the smallest mean over standard deviation ratio based of the representative vectors of each payer's EOB can be removed from the cosine similarity check to reduce the computational complexity of the classification procedure. Block 320 includes assigning a weight for the weighted cosine similarity Wc[q] for dimension q. When the representative code of the autoencoder is 2048, for example, q would be any number between 0 and 2047−1=2046. If Wc[q] is 0, the dimension q would not be considered for calculating the cosine similarity score. In some embodiments, there is a provisioned threshold on the rank of features/dimensions below which a feature/dimension is allowed to be removed from the cosine similarity calculation; likewise, there is also a provisioned threshold on the rank of features/dimensions below which a feature/dimension cannot be removed from the cosine similarity calculation.

Block 321 includes constructing a matrix A, where each row is the representative vector converted using the above mentioned autoencoder.

Next, block 322 includes re-arranging A[p, q] into B[i, j, pi, q] according to each row's payer and EOB or non-EOB tag where p and pi are sequence indexes, i is the payer, j is 0 for EOB and 1 for non-EOB, and q is the dimension of the representative vector.

Block 323 includes constructing a matrix Ca[i, k, q] from matrix B constructed at block 322, where Ca[i, 0, q] is the average component value of the representative vector for payer i and dimension q if the vector is encoded from an EOB image; while Ca[i, 1, q] is the average component value of the representative vector for payer i and dimension q if it is encoded from a non-EOB image.

Next, block 324 includes constructing matrix Csd[i, j, q] from matrix B constructed at block 322, where Csd[i, 0, q] is the standard deviation value of the representative vector for payer i and dimension q if the vector is encoded from an EOB image; while Csd[i, 1, q] is the standard deviation value of the representative vector for payer i and dimension q if it is encoded from a non-EOB image.

Next, block 325 includes constructing a matrix D[i, j, q] where D[i, 0, q] is the absolute value of the ratio of Csd[i, 0, q] over Ca[i, 0, q] generated at blocks 323 and 324, and where D[i, 1, q] is the absolute value of the ratio of Csd[i, 1, q] over Ca[i, 1, q]. In block 326, M is preset to all 0; D is assigned a rank which is from 0 to q−1 according to the payer i and EOB or non-EOB. Then, M[i, q] is set to 1 if D[i, 0, q] or D[i, 1, q] is higher than a provisioned rank.

Block 327, includes constructing a matrix L[i, q], where L is initially preset to all 0. Then, L[i, q] is set to 1 if the ranking of D[i, 0, q] is lower than a provisioned rank. In operation, L considers only the EOB part of the D matrix.

Finally block 328 includes calculating the weight for the cosine similarity score, Wc[q], which is first preset to all 1. Then Wc[q] is set to 0 if any L[i, q] is 1 and all M[i, q] are 0s. Wc[q] becomes the indication of whether a particular dimension or feature is included in the weighted cosine similarity score calculation. In operation, this process of removing particular dimensions/features from the weighted cosine similar scoring procedure reduces the computational complexity dramatically, thereby providing computational efficiencies to the classification procedure as compared to prior methods.

Figure 4A:
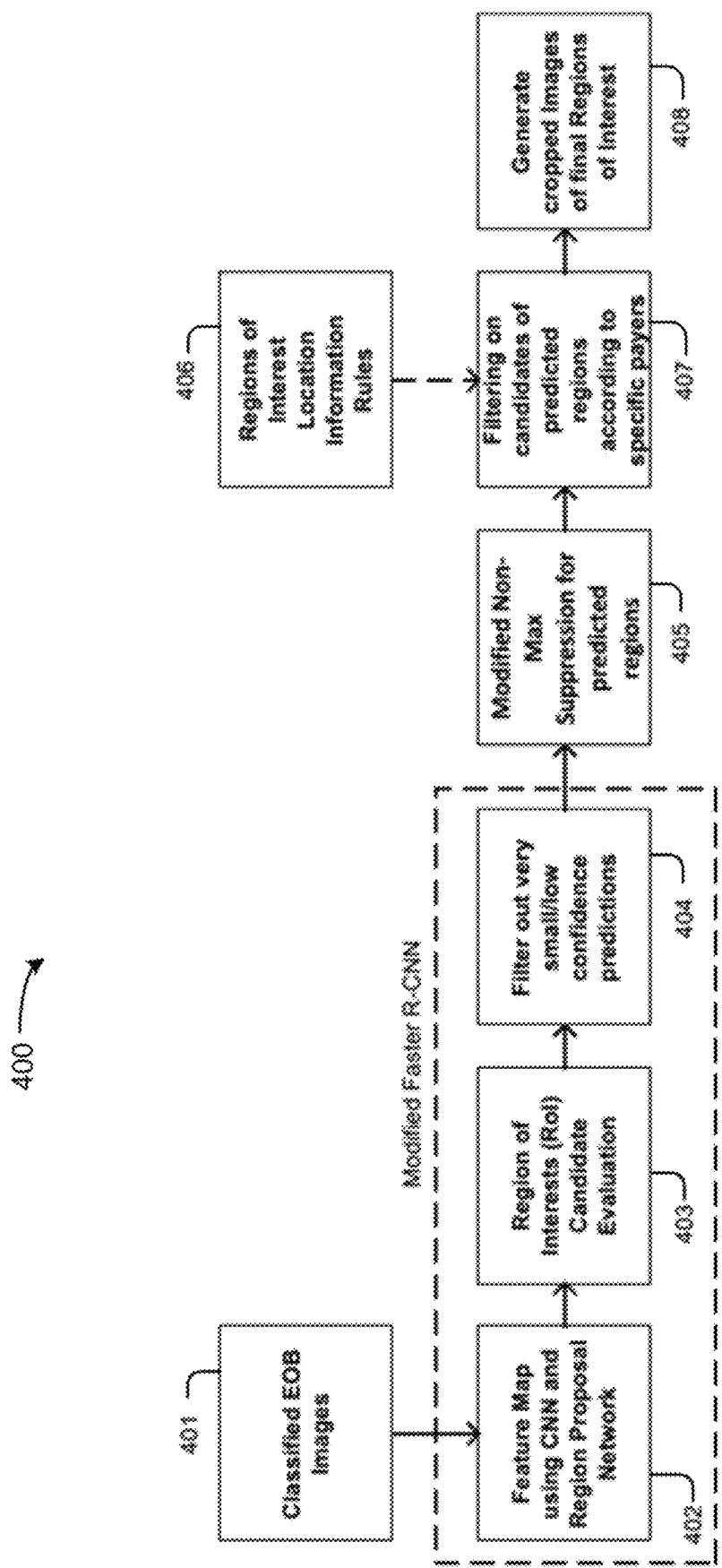
FIG. 4(a) shows an example flow diagram for auto-banding according to some embodiments.
Figure 4A:
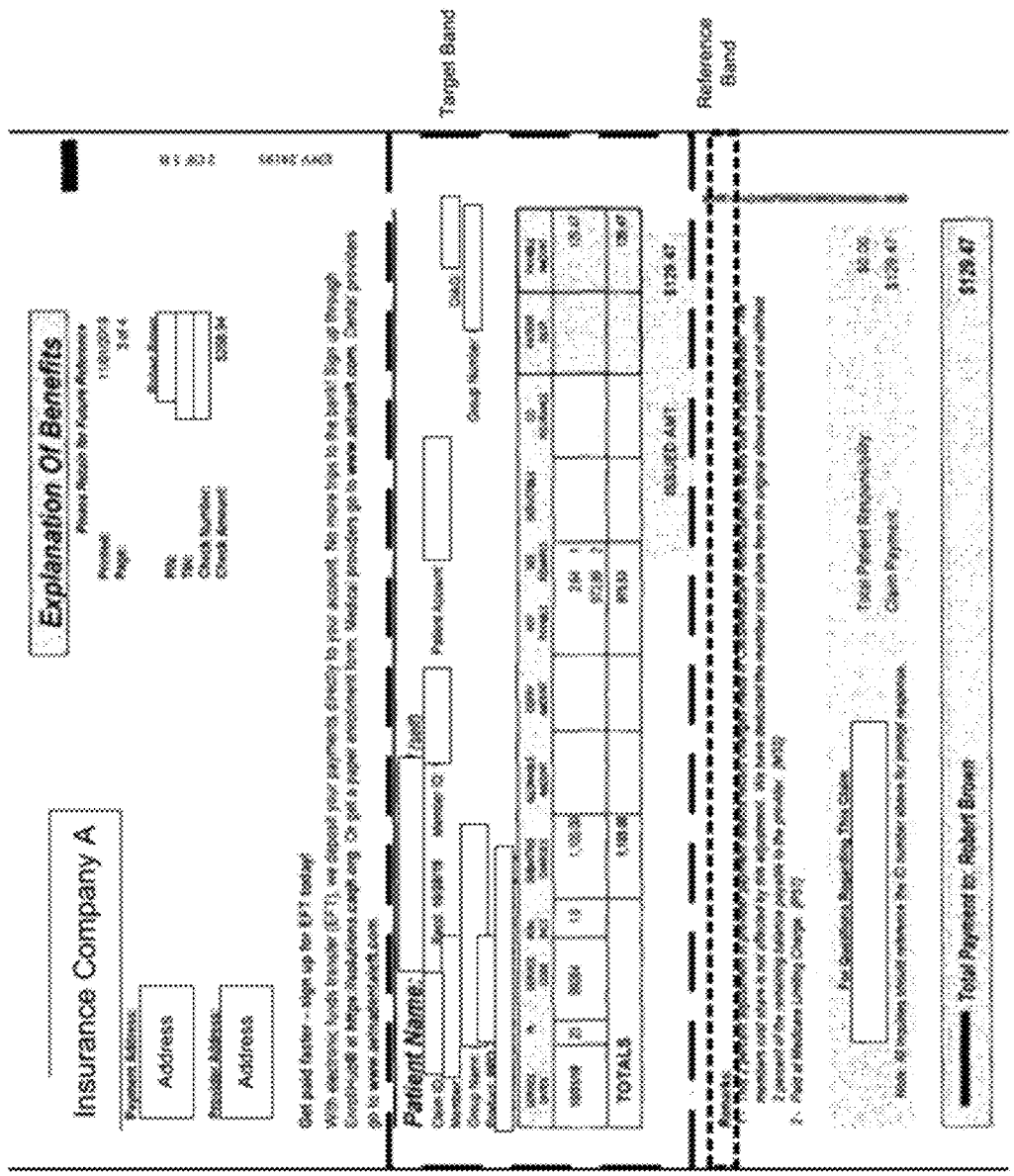

FIG. 4(a) illustrates an example process 400 for auto-banding that identifies areas of interests within an EOB from where information can be extracted to construct the EDI-835 transaction set. This auto-banding functions looks like a traditional object localization problem solver. However, because the relationship between EOB type-setting style and the area of interest relationship is known, FIG. 4(a) presents a new approach to reduce the computational efforts required by introducing additional rules and a modified non-max suppression algorithm. In operation, the procedure include instituting two classes: a target band and a reference band. For example, as shown in FIG. 4(b), not only the actual payment information is boxed and labeled as the target band but also the reference band is labeled as there are noticeable relationship between them. In operation, identifying the reference band locations in an EOB helps to ensure the payment information as the target band are identified and localized correctly. Rules are applied to check on certain relationships between various target bands and reference bands when the target band are identified and located.

Block 401 includes providing the EOB image in which the payer has already been identified. The objects of interest to be detected are identified in block 402 and 403 using a Faster Region-based Convolutional Neural Network (Faster R-CNN) as its object detection and location engine. Block 402 includes extracting the features from the images. Block 403 includes identifying regions of interest via a Region Proposal Network (RPN), a classification engine. the procedures implemented at block 402 and block 403 together effectively detect/identify the objects according to a set of Proposals which identify various locations and shapes as shown in FIG. 4(c).

Figure 4C:
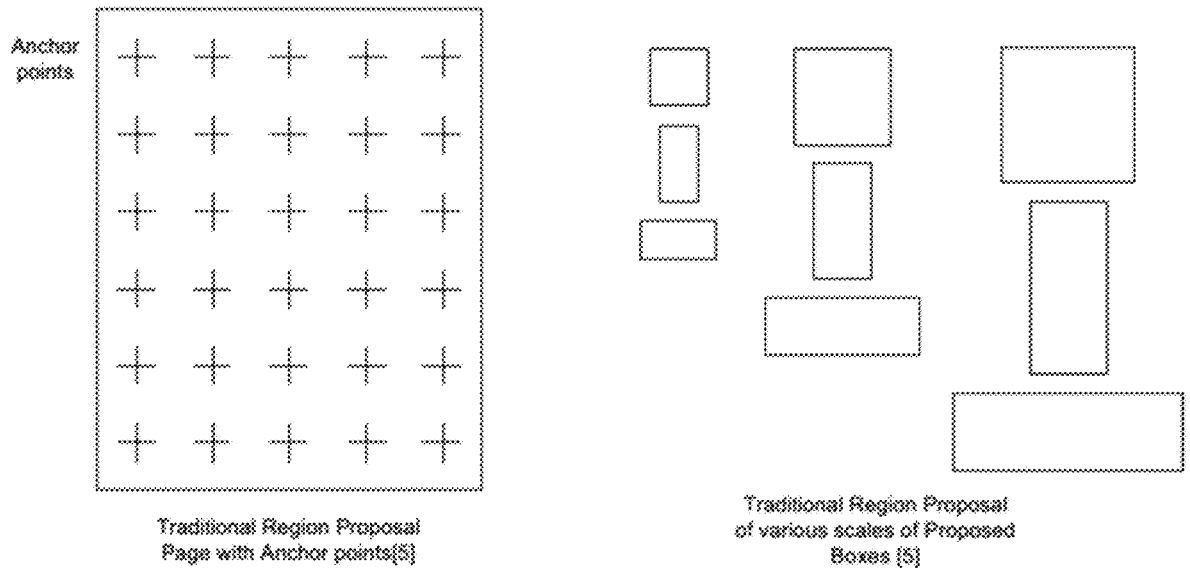
FIG. 4(c) shows an example of the linear arrangement of the anchor locations and variation of region proposals to reduce the computational complexity required to implement some embodiments in comparison with the traditional Faster R-CNN of using two-dimensional arrangement for traditional image identification.
Figure 4C:
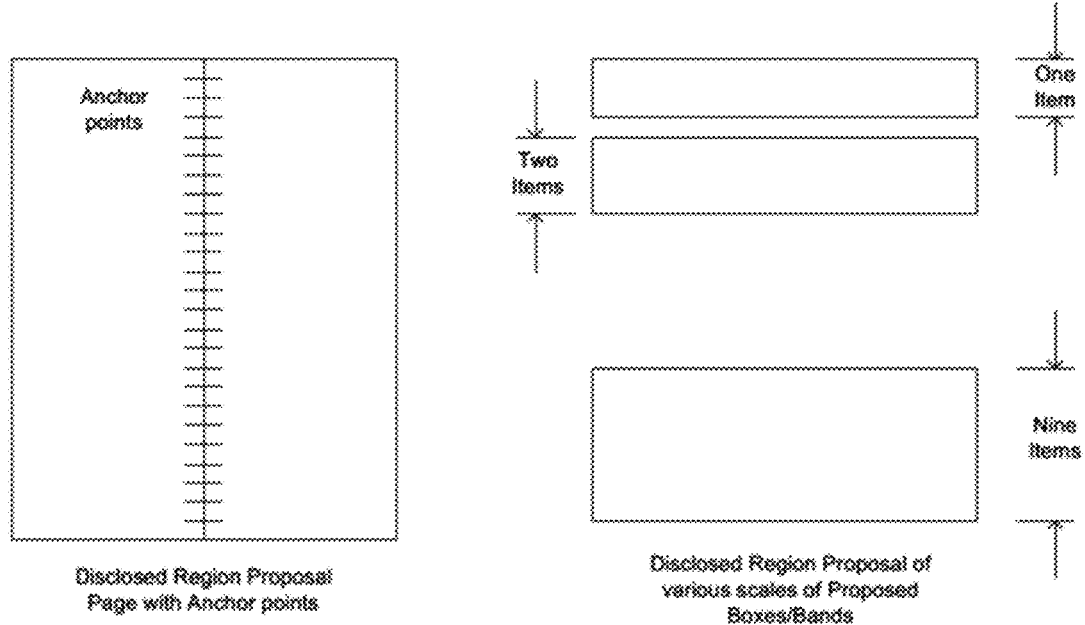

Traditionally, anchor points are placed at grid points; the region proposal includes boxes of different sizes and aspect ratios as shown in FIG. 4(c). In this example, the anchors are chosen to be with a linear fashion. The boxes used in a traditional RPN are bands with different heights instead of various sizes and aspect rations. With the approach disclosed herein, the computational complexity is thus reduced from a two-dimensional problem into a single dimensional one, thereby resulting in computational efficiencies as compared to other approaches.

Objects from a set of training images are labeled with a name representing the object and a box for the location in the image. This set of training images are EOB samples with boxes indicating the areas where payment information is located. The process further synthesizes additional training images by rotating, blurring/dilating, magnifying, reducing, moving up/down, and moving left/right a few pixels from the collected payment information images or the target bands which represent the object to train this Faster R-CNN. Moreover, further synthesis of additional training images are done by randomly placing a few completely unrelated objects like a few rectangles into randomly selected existing training image.

Block 402 includes providing three streams of outputs: (1) the type of object it identified in an image, (2) the object location and size, and (3) a score representing the likelihood/probability that the identified type of object and location is true. A list of candidates is selected in block 403 and followed by removing less likely candidates using a set of rules in block 404. For example, the rules may include rules for determining if the area is too small or too big, or the location is too close to the periphery of a page, etc. One may notice that a single area could be boxed by multiple types of payment information of different payers; each box has its own slightly different location but overlapped with a different probability score.

Block 405 includes performing Non-maximum (Non-Max) Suppression to the list of predicted regions identified via the Modified Faster R-CNN process described above. The process at block 405 includes taking the list of identified objects to remove false identifications. When two objects are found to have overlaps above a provisioned threshold, the object receiving a lower score than the provisioned minimum-score from block 404 will be removed, and the two overlapping objects can be merged into a single object. In some embodiments, block 405 is implemented using a modified Non-Max Suppression algorithm described further with reference to FIG. 4(e).

Block 406 includes applying a set of pre-identified rules used for determining the possible locations or shapes of the detected object(s). Since reference bands are defined, relationship rules are thus provisioned among the target bands as well as between target band and reference band. Next, block 407 includes removing objects that do not match the rules in block 406. Finally, block 408 includes cropping objects from the image to be stored as the areas of interest.

Figure 4D:
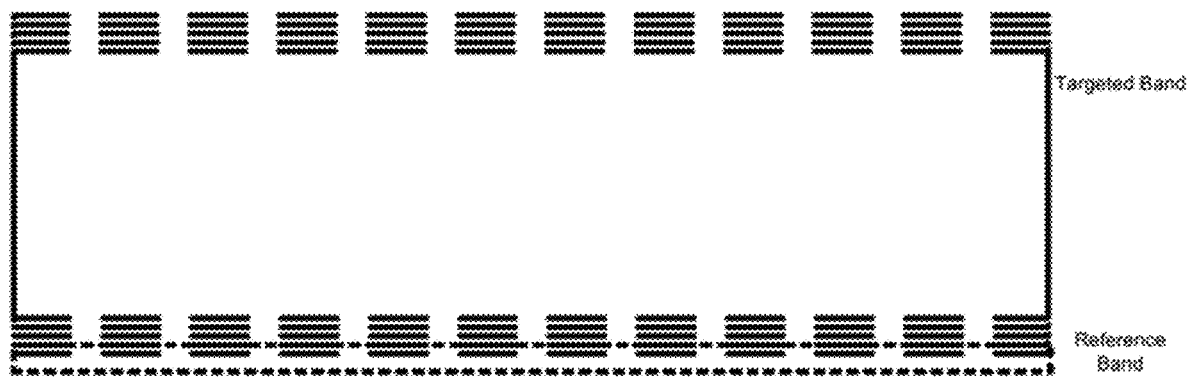
FIG. 4(d) shows an example of the objects (Target Band and Reference Band) identified where the same Target Band is referenced by multiple boxes and must be cleaned up using a Non-max Suppression Algorithm consistent with some embodiments.

The output list of a Faster R-CNN block as shown in FIG. 4(a) could identify the same objects with a different box of location and probability as shown in FIG. 4(d). Traditionally, when two identified regions of interest overlap with each other with a high Intersection of Union (IoU) score, one of identified regions will be dropped based on its score. Different labeled objects are treated equally. In this disclosed approach, reference band and target band objects belong to two distinct categories and are treated differently. Reference band objects take higher priority to be preserved than the target band objects. By preserving the reference band objects through the Non-maximum (Non-Max) Suppression process, the semantic meaning of the target band objects can be better interpreted and identified. The process for the modified Non-Max Suppression approach is shown in FIG. 4(e).

Figure 4E:
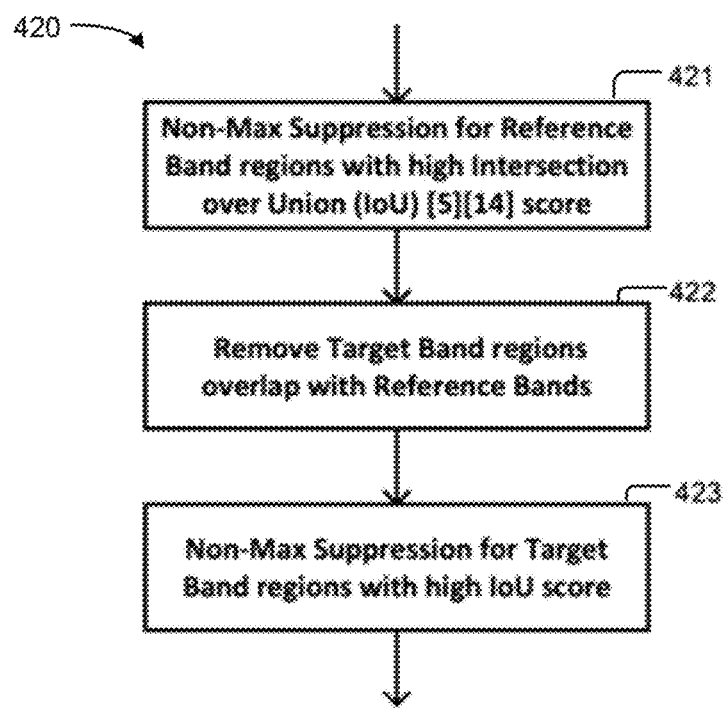
FIG. 4(e) shows an example of a modified Non-max Suppression process taking the Reference Band and Target Band as two different categories of objects consistent with some embodiments.

As shown in FIG. 4(e), reference bands are processed in block 421 first using the Non-max Suppression method among reference bands using the Intersection of Union (IoU) scores. Multiple objects having an IoU score above a provisioned threshold should be considered as the same object, and thus, merged into a single object. Overlap between reference band and target bands are ignored in block 421. Then, target bands that overlap with reference bands are removed in block 422. Then, block 423 includes performing the Non-max Suppression operation to target bands only.

Figure 5:
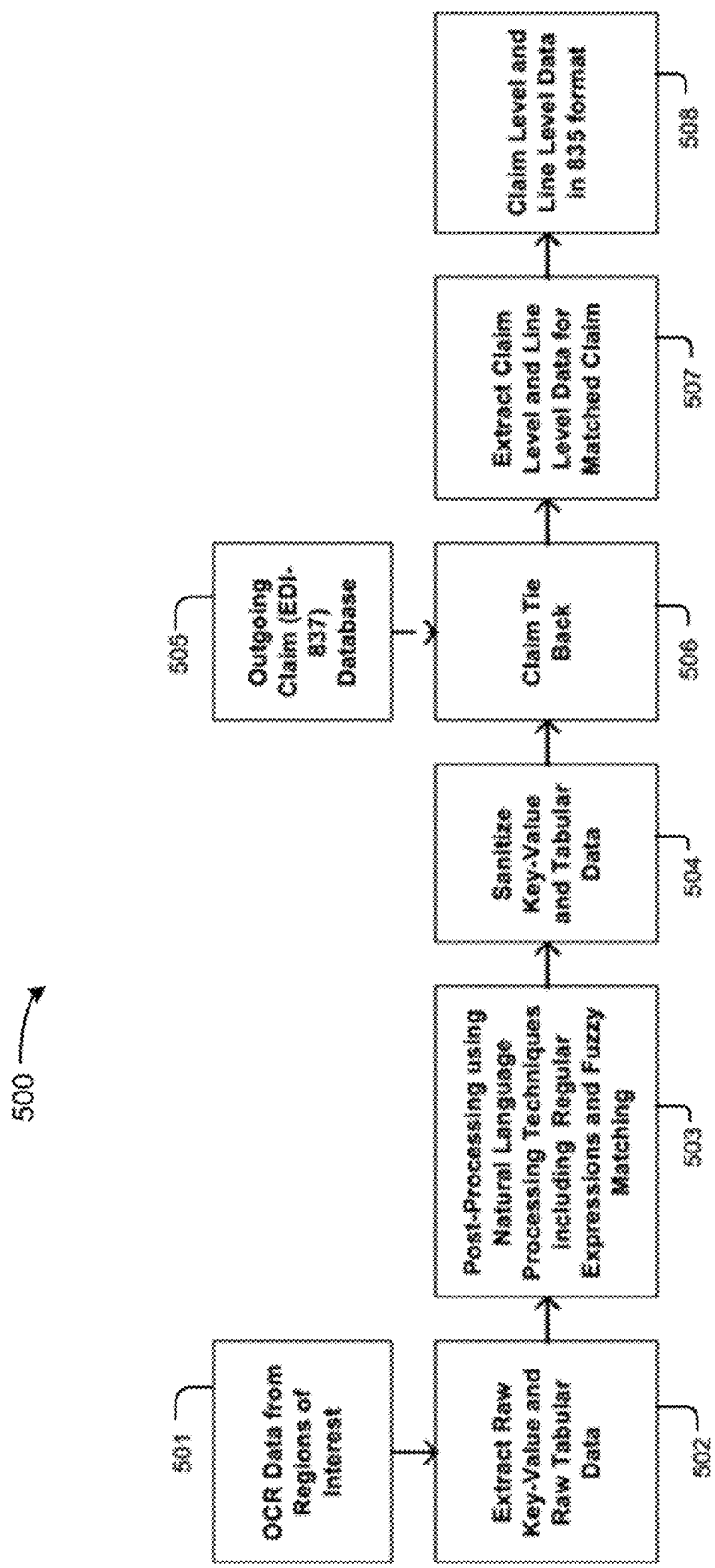
FIG. 5 shows an example flow diagram for contextual data extraction according to some embodiments.

FIG. 5 illustrates an example data extraction method 500 to extract interesting information like words, numbers, and/or phrases to construct an EDI-835 transaction set using contextual relationships like location relationship and sequence relationship among words, numbers, and/or phrases extracted from an image using OCR.

Block 501 includes providing all the words, numbers, and/or characters extracted using OCR methods together with their corresponding location(s) and sequence relationships. Block 502 includes identifying and organizing the keywords and their values and tabular formatted contents based on, for example, each word or character's location, font type, and font size.

Block 503 includes screening keywords, values, and tabular formatted information using a 'regular expression' method and other matching methods like 'Fuzzy' matching methods using Levenshtein Distance. Then, Natural Language Processing (NLP) techniques are employed to identify Name Entities (keywords and key phrases) that are representative to the context. Some key phrases are composed by words positioned horizontally, and some are composed vertically. Once each word is identified, clusters of words are formed based on factors including their geographical locations, occupied areas, font types, and font size. Thus, tabular format information is identified to reconcile the Name Entities with their respective values. For example, FIG. 4(b) shows that the Patient Name has a large font size; and column names of the table in the Target Band like COPAY AMOUNT are composed vertically.

Block 504 includes correcting and validating the keywords and their values by validating the keywords when sometimes the exact wording may not be used. When the score of the fuzzy matching procedure is lower than a provisioned value, the value would not be used in further considerations.

Block 505 shows the EDI-837 database which must be matched against an EDI-835 record to establish a correspondence relationship. According to the sanitized key-values derived in block 504, 'Claim ID' shall be identified; thus, related EDI-837 information like the claimed amount and procedure code(s) charged is retrieved in block 506. Related 'Claim Level' information, like paid total amount, and 'Line Level' information, like procedure details, etc., are matched and confirmed in block 507 followed by organizing them into an EDI-835 ready format in block 508. If there is any mismatches detected in block 507, the unfilled item will be flagged and labeled.

Figure 6:
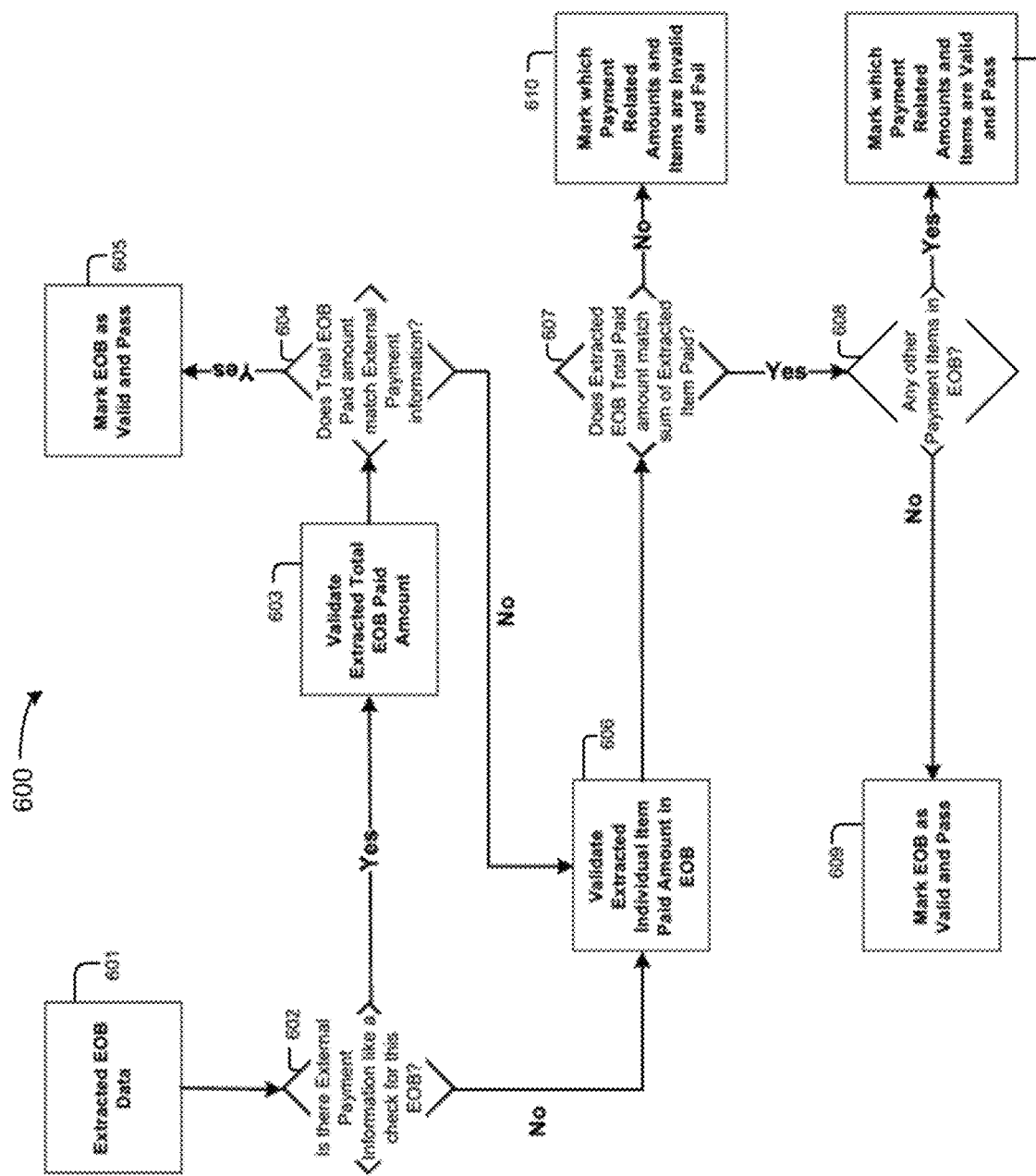
FIG. 6 shows an example flow diagram for validation of the extracted EOB information according to some embodiments.

Once the extracted EOB information is available, the contents are reconciled via example method 600 shown in FIG. 6.

Block 601 includes receiving the extracted data for reconciling. In some embodiments, an external value of the payment amount from the database in block 602 could either be presented or not. This external value could be provided by an operator while reading a payment check or through other means. The task in block 602 is to check whether this information exists or not. If the payment amount is available in the payment advice, this value is verified by matching the amount shown in the amount extracted from the EOB in block 603 and 604. When the externally collected payment received is not available or its amount does not match with the amount in the EOB document, individual items are checked to confirm that the EOB record holds, and that the external information received match with the extracted information in EOB. These checking steps are done in blocks 606, 607 and 608. It should be noted that payment from the payer could be delivered through other means like an Electronic Funds Transfer (EFT) instead of using paper checks together with an EOB. In block 607, when the Extracted Total payment amount does not match with the sum of all the Extracted items paid, those items will be marked 'invalid' in the database and the validation fails in block 610. If the amounts in block 607 match, the existence of other items in the EOB is checked. If yes, the extracted items are marked as valid and the validation passes in block 611; if no, the entire EOB is marked valid, and the validation also passes as in 609.

The method 700 shown in FIG. 7 is an improvement over the method 200 shown in FIG. 2. In method 700, an improved workflow to convert EOB document into EDI-835 transaction set is illustrated. As illustrated in block 701, once the EOB images and their metadata are stored in the storage, the block 702 loads the related information and image into the server so that they become accessible to the server. This is assisted by using additional information available from block 707 where correspondence information is available.

Block 703 includes identifying whether the set of images and their corresponding metadata truly represent an EOB document. Block 703 also includes identifying which payer a particular EOB document corresponds to. For example, block 703 includes identifying that an EOB is from a specific payer.

Once an EOB is identified as being from a specific payer using a pointer 'current pick' at block 703, block 704 includes identifying a specific region where EOB payment information is located so that the identified region or regions are cropped from the image for further processing using Optical Character Recognition (OCR) techniques in block 705. Once characters and their locations are identified, words, phrases and their meanings are extracted according to their context using various NLP techniques in block 706 similar to block 206, 502, and 503. Aspects of this context-based extraction is described in further detail with reference to FIG. 5.

In operation, the functions performed at blocks 701, 702, 703, 704, 705 and 706 are similar to the functions at blocks 201, 202, 203, 204, 205 and 206 in FIG. 2 except that block 703 provides additional information. Instead of providing only the most probable type of EOB or non-EOB and its payer for further verification in block 203, block 703 includes generating a list of choices of probable types of EOB ranked according to the inferred probability, and providing that generated list of choices to block 704 and block 707.

Block 704 includes electing the most likely type as an initial pick until feedback is provided from block 707 to make a new pick. Block 707 includes instructing a new choice of EOB label of payer to block 704 when the payment information extracted from the previous choice are invalidated.

Once the contents are extracted, block 708 includes validating the contents using the EDI-837 information already available from the service provider or hospital. This validation process uses the EDI-837 to reconcile which hospital or service provider submitted the EOB to the payer to verify that the EOB truly represents a response from the submitted payment claims. If the process at block 708 fails to verify the relationship between the EOB and an EDI-837 transaction set, block 713 includes checking whether there is another possible choice of type of EOB exists. If yes, the process 700 will return to block 703 so that a new 'current pick' can be made for block 704 to proceed. If not, the EDI-835 information must be manually processed and then keyed-in into the database the traditional way at block 709. Once the manual operation is verified in block 710 using the same validation process in block 708, the extracted data is populated into the EDI-835 database as indicated in block 711. Block 712 includes representing that an EDI-835 record is marked to be ready to be transferred to the service provider or the hospital. In operation, the functionality performed at blocks 708, 709, 710, and 711 is like the functionality performed at blocks 208, 209, 210, and 211 respectively.

Figure 8:
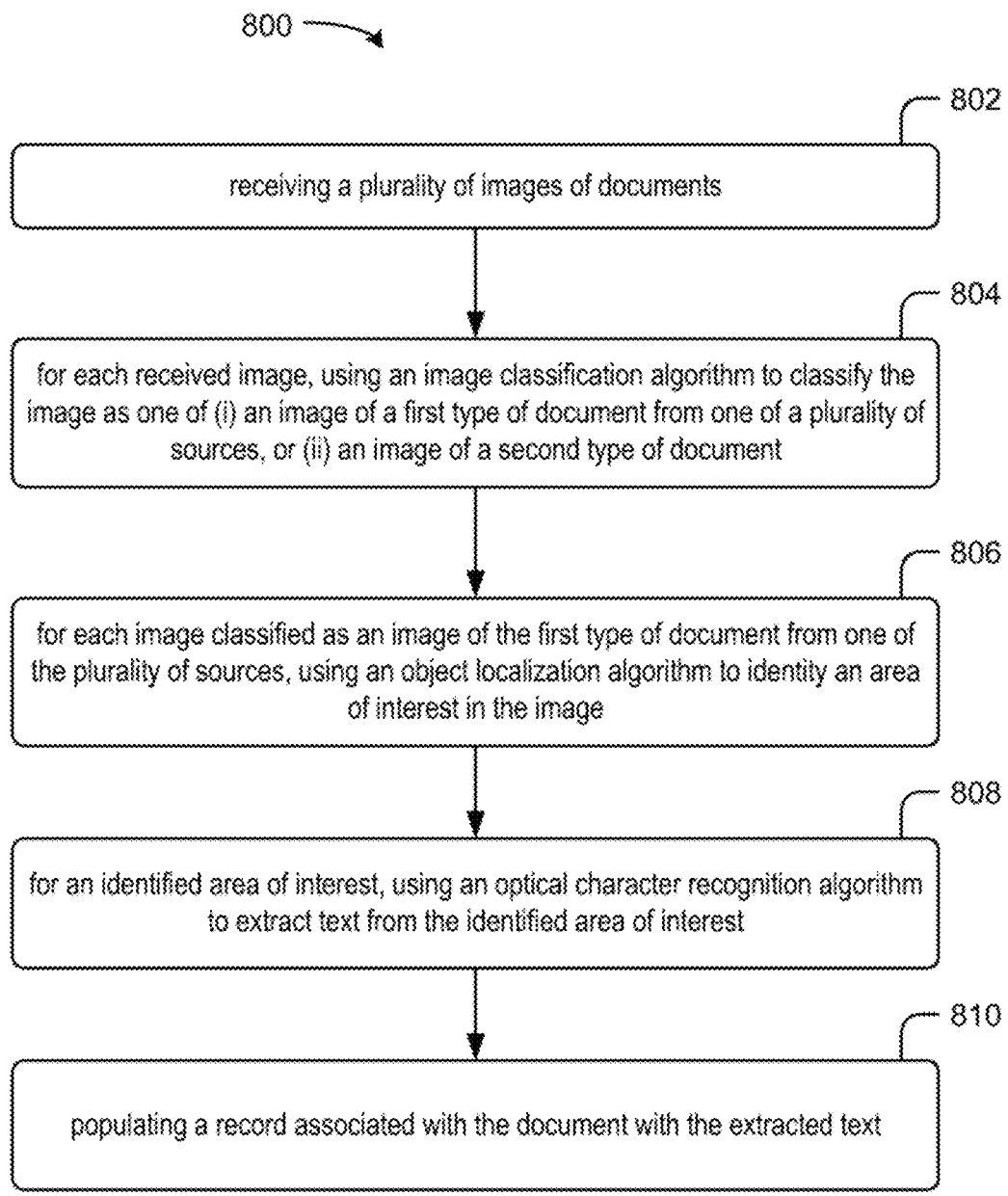
FIG. 8 shows aspects of an example method for automatically converting EOB printable documents into an electronic format using artificial intelligence techniques according to some embodiments.

FIG. 8 shows aspects of an example method 800 for automatically converting EOB printable documents into an electronic format using artificial intelligence techniques according to some embodiments.

Method 800 begins at method block 802, which includes receiving a plurality of images of documents. In some instances, aspects of receiving the plurality of images of documents at method block 802 are the same as or similar to the procedure described with reference to process blocks 201 and 202 shown in FIG. 2 and/or process blocks 701 and 702 shown in FIG. 7.

Next, method 800 advances to method block 804, which includes for each received image at block 802, using an image classification algorithm to classify the image as one of (i) an image of a first type of document from one of a plurality of sources, or (ii) an image of a second type of document. In some instances, aspects of using the image classification algorithm in method block 804 are the same as or similar to the procedure described with reference to process block 203 shown in FIG. 2, process block 306 shown in FIG. 3, and/or process block 703 shown in FIG. 7. In operation, the image classification algorithm used at method block 804 may be the same as or similar to any of the image classification algorithms and procedures disclosed or described herein, individually or in combination. Further, any other image classification now known or later developed that is suitable for use with the processes disclosed herein could be used as well.

In some embodiments, at method block 804, the first type of document from one of the plurality of sources is an Explanation of Benefits (EOB) document from one of a plurality of payers, and the second type of document is a document other than an EOB document. In such embodiments, using an image classification algorithm to classify the image as one of (i) an image of a first type of document from one of a plurality of sources or (ii) an image of a second type of document comprises at method block 804 includes: (A) using an autoencoder to generate a feature vector corresponding to the image; (B) determining a plurality of similarity scores for the image, wherein each similarity score corresponds to a similarity between (i) the feature vector corresponding to the image and (ii) a representative feature vector corresponding to one of the plurality of payers; and (C) classifying the image as corresponding to an EOB document from one of the plurality of payers based at least in part on the plurality of determined similarly scores.

In some embodiments, the similarity scores in some implementations of method block 804 include one or more of a cosine similarity, Euclidean distance, or a Kullback-Leibler divergence.

And in some embodiments, each representative feature vector corresponding to one of the plurality of payers (i) comprises features having a mean over standard deviation score above a provisioned threshold and (ii) excludes features having a mean over standard deviation score below the provisioned threshold. In operation, the mean over standard deviation score can be determined according to any of the methods for determining a mean over standard deviation disclosed herein or any other suitable method for calculating a mean over standard deviation now known or later developed.

In some embodiments, the optional sub-step (A) above of using an autoencoder to generate a feature vector corresponding to the image in some implementations of method block 804 includes encoding the image into a multi-dimensional vector with an autoencoder that has been trained using a set of images comprising (i) images of explanation of benefits documents from each of the plurality of payers and (ii) images of documents that are not explanation of benefits documents. In some instances, aspects of using an autoencoder to generate a feature vector corresponding to the image are the same as or similar to the procedure described with reference to process block 305 shown in FIG. 3. In some embodiments, the autoencoder used in these implementations of method block 804 may be the same as or similar to any of the autoencoders disclosed or described herein. Further, any other autoencoder or autoencoding approach now known or later developed that is suitable for use with the processes disclosed herein could be used as well.

In some embodiments where the first type of document from one of the plurality of sources is an Explanation of Benefits (EOB) document from one of a plurality of payers and the second type of document is a document other than an EOB document, the step of classifying the image as corresponding to an EOB document from one of the plurality of payers based at least in part on the plurality of similarity scores for the image at method block 804 includes classifying the image as corresponding to an EOB document from one of the plurality of payers based at least in part on one or both of (i) the plurality of similarly scores for the image and/or (ii) at least some of the text extracted from the identified area of interest in the image.

Further, in some embodiments where the first type of document from one of the plurality of sources is an Explanation of Benefits (EOB) document from one of a plurality of payers and the second type of document is a document other than an EOB document, the step of classifying the image as corresponding to an EOB document from one of the plurality of payers based at least in part on one or both (i) the plurality of similarly scores for the image and/or (ii) at least some of the text extracted from the identified area of interest in the image at method block 804 includes: (i) generating a first classification of the image, wherein the first classification identifies one of the plurality of payers; (ii) when the one of the plurality of payers identified in the first classification is consistent with payer information within EDI-837 data corresponding to the image, selecting the first classification as the classification of the image; and (iii) when the one of the plurality of payers identified in the first classification is inconsistent with payer information within EDI-837 data corresponding to the image, generating a second classification of the image, wherein the second classification identifies one of the plurality of payers that is different than the payer identified in the first classification.

Next, method 800 advances to method block 806, which includes for each image classified as an image of the first type of document from one of the plurality of sources, using an object localization algorithm to identity an area of interest in the image. In some instances, aspects of using an object localization algorithm to identity an area of interest in the image in method block 806 are the same as or similar to the procedure described with reference to process block 204 shown in FIG. 2 and/or process block 704 shown in FIG. 7.

In some embodiments, the area of interest determined at method block 806 comprises a target band that substantially spans a width of the image. In such embodiments, for each image classified as an image of the first type of document from one of the plurality of sources, using an object localization algorithm to identity an area of interest in the image at method block 806 includes (i) identifying a reference band in the image that spans the width of the image; and (ii) identifying the target band based at least in part on the reference band, wherein the target band is above the reference band and does not overlap the reference band.

In some embodiments, the method block 806 process of, for each image classified as an image of the first type of document from one of the plurality of sources, using an object localization algorithm to identity an area of interest in the image includes: (i) extracting features from the image; (ii) using a Faster Region-based Convolutional Neural Network (Faster R-CNN) to identify one or more predicted regions based on the extracted features, wherein each predicted region spans a width of the image; (iii) for each predicted region identified via the Faster R-CNN, using a modified Non-Maximum (Non-Max) Suppression procedure to merge any one or more overlapping predicted regions into a single area of interest based at least in part on an Intersection of Union score; and (iv) cropping the single area of interest from the image. In some embodiments, one or more of the Faster R-CNN and modified Non-Max Suppression procedures implemented at method block 806 are the same or similar to the Faster R-CNN and modified Non-Max Suppression procedures shown and described with reference to FIG. 4.

Next method 800 advances to method block 808, which includes for an identified area of interest, using an optical character recognition algorithm to extract text from the identified area of interest. In some instances, aspects using an optical character recognition algorithm to extract text from the identified area of interest in method block 808 are the same as or similar to the procedure described with reference to process block 205 shown in FIG. 2 and/or process block 705 shown in FIG. 7.

Next, method 800 advances to method block 810, which includes populating a record associated with the document with the extracted text. In some instances, aspects of populating a record associated with the document with the extracted text in method block 810 are the same as or similar to the procedure described with reference to process block 211 shown in FIG. 2 and/or process block 711 shown in FIG. 7.

In some embodiments, the method block 810 process of populating a record associated with the document with the extracted text includes: (i) generating an EDI 835 compliant record based at least in part on the extracted text; and (ii) identifying a previously-generated EDI 837 compliant record that corresponds to the generated EDI 835 compliant record.

The above discussions relating to computing systems, processes, and methods provide only some examples of operating environments within which the features and functions disclosed herein may be implemented. Other operating environments and configurations of computing devices and/or computing systems, methods of operating such computing devices and/or systems, and/or processes implemented by such computing devices and/or systems not explicitly described herein may also be applicable and suitable for implementation of the disclosed functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, process block, method steps, processing, and other symbolic representations that directly or indirectly resemble the operations of networked computing devices and/or computing systems. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a random access memory, read only memory, computing database, DVD, CD, Blu-ray, and so on, storing the software and/or firmware for implementation by one or more processors of a computing device and/or computing system.

What is claimed is:

1. A method comprising:
   receiving a plurality of images of documents;
   for each received image, using an image classification algorithm to classify the image as one of (i) an image of a first type of document from one of a plurality of sources, or (ii) an image of a second type of document;
   for each image classified as an image of the first type of document from one of the plurality of sources, using an object localization algorithm to identity one or more areas of interest in the image, wherein the one or more areas of interest comprise a target band that substantially spans a width of the image, and wherein using the object localization algorithm to identity the one or more areas of interest in the image comprises: (i) identifying a reference band that substantially spans the width of the image and (ii) identifying the target band based at least in part on the reference band;
   for the identified one or more areas of interest, using an optical character recognition algorithm to extract text from the identified one or more areas of interest; and
   populating a record associated with the document with the extracted text.

2. The method of claim 1, wherein the first type of document from one of the plurality of sources is an Explanation of Benefits (EOB) document from one of a plurality of payers, wherein the second type of document is a document other than an EOB document, and wherein using an image classification algorithm to classify the image as one of (i) an image of a first type of document from one of a plurality of sources or (ii) an image of a second type of document comprises:
   using an autoencoder to generate a feature vector corresponding to the image;
   determining a plurality of similarity scores for the image, wherein each similarity score corresponds to a similarity between (i) the feature vector corresponding to the image and (ii) a representative feature vector corresponding to one of the plurality of payers; and
   classifying the image as corresponding to an EOB document from one of the plurality of payers based at least in part on the plurality of determined similarity scores.

3. The method of claim 2, wherein the similarity scores comprise one or more of a cosine similarity, Euclidean distance, or a Kullback-Leibler divergence.

4. The method of claim 3, wherein each representative feature vector corresponding to one of the plurality of payers (i) comprises features having a mean over standard deviation score above a provisioned threshold and (ii) excludes features having a mean over standard deviation score below the provisioned threshold.

5. The method of claim 2, wherein generating a feature vector corresponding to the image comprises encoding the image into a multi-dimensional vector with an autoencoder that has been trained using a set of images comprising (i) images of explanation of benefits documents from each of the plurality of payers and (ii) images of documents that are not explanation of benefits documents.

6. The method of claim 2, wherein classifying the image as corresponding to an EOB document from one of the plurality of payers based at least in part on the plurality of determined similarity scores for the image comprises:
   classifying the image as corresponding to an EOB document from one of the plurality of payers based at least in part on (i) the plurality of determined similarity scores for the image and (ii) at least some of the text extracted from the identified area of interest in the image.

7. The method of claim 6, wherein classifying the image as corresponding to an EOB document from one of the plurality of payers based at least in part on (i) the plurality of determined similarity scores for the image and (ii) at least some of the text extracted from the identified area of interest in the image comprises:
- generating a first classification of the image, wherein the first classification identifies one of the plurality of payers;
- when the one of the plurality of payers identified in the first classification is consistent with payer information within EDI-837 data corresponding to the image, selecting the first classification as the classification of the image; and
- when the one of the plurality of payers identified in the first classification is inconsistent with payer information within EDI-837 data corresponding to the image, generating a second classification of the image, wherein the second classification identifies one of the plurality of payers that is different than the payer identified in the first classification.

8. The method of claim 1, wherein the target band is above or below the reference band and does not overlap the reference band.

9. The method of claim 1, wherein for each image classified as an image of the first type of document from one of the plurality of sources, using an object localization algorithm to identity one or more areas of interest in the image further comprises:
- extracting features from the image;
- using a Faster Region-based Convolutional Neural Network (Faster R-CNN) to identify one or more predicted regions based on the extracted features, wherein at least one predicted region spans a width of the image;
- for each predicted region identified via the Faster R-CNN, using a modified Non-Maximum (Non-Max) Suppression procedure to merge any one or more overlapping predicted regions into a single area of interest based at least in part on an Intersection of Union score; and
- cropping the single area of interest from the image.

10. The method of claim 1, wherein populating a record associated with the document with the extracted text comprises:
- generating an EDI 835 compliant record based at least in part on the extracted text; and
- identifying a previously-generated EDI 837 compliant record that corresponds to the generated EDI 835 compliant record.

11. Tangible, non-transitory computer-readable media comprising program instructions stored therein, wherein the program instructions, when executed by one or more processors, cause a computing system to perform functions comprising:
- receiving a plurality of images of documents;
- for each received image, using an image classification algorithm to classify the image as one of (i) an image of a first type of document from one of a plurality of sources, or (ii) an image of a second type of document;
- for each image classified as an image of the first type of document from one of the plurality of sources, using an object localization algorithm to identity one or more areas of interest in the image, wherein the one or more areas of interest comprise a target band that substantially spans a width of the image, and wherein using the object localization algorithm to identity the one or more areas of interest in the image comprises: (i) identifying a reference band that substantially spans the width of the image and (ii) identifying the target band based at least in part on the reference band;
- for the identified one or more areas of interest, using an optical character recognition algorithm to extract text from the identified one or more areas of interest; and
- populating a record associated with the document with the extracted text.

12. The tangible, non-transitory computer-readable media of claim 11, wherein the first type of document from one of the plurality of sources is an Explanation of Benefits (EOB) document from one of a plurality of payers, wherein the second type of document is a document other than an EOB document, and wherein using an image classification algorithm to classify the image as one of (i) an image of a first type of document from one of a plurality of sources or (ii) an image of a second type of document comprises:
- using an autoencoder to generate a feature vector corresponding to the image;
- determining a plurality of similarity scores for the image, wherein each similarity score corresponds to a similarity between (i) the feature vector corresponding to the image and (ii) a representative feature vector corresponding to one of the plurality of payers; and
- classifying the image as corresponding to an EOB document from one of the plurality of payers based at least in part on the plurality of determined similarity scores.

13. The tangible, non-transitory computer-readable media of claim 12, wherein the similarity scores comprise one or more of a cosine similarity, Euclidean distance, or a Kullback-Leibler divergence.

14. The tangible, non-transitory computer-readable media of claim 13, wherein each representative feature vector corresponding to one of the plurality of payers (i) comprises features having a above a provisioned threshold and (ii) excludes features having a mean over standard deviation score below the provisioned threshold.

15. The tangible, non-transitory computer-readable media of claim 12, wherein generating a feature vector corresponding to the image comprises encoding the image into a multi-dimensional vector with an autoencoder that has been trained using a set of images comprising (i) images of explanation of benefits documents from each of the plurality of payers and (ii) images of documents that are not explanation of benefits documents.

16. The tangible, non-transitory computer-readable media of claim 12, wherein classifying the image as corresponding to an EOB document from one of the plurality of payers based at least in part on the plurality of determined similarity scores for the image comprises:
- generating a first classification of the image, wherein the first classification identifies one of the plurality of payers;
- when the one of the plurality of payers identified in the first classification is consistent with payer information within EDI-837 data corresponding to the image, selecting the first classification as the classification of the image; and
- when the one of the plurality of payers identified in the first classification is inconsistent with payer information within EDI-837 data corresponding to the image, generating a second classification of the image, wherein the second classification identifies one of the plurality of payers that is different than the payer identified in the first classification.

17. The tangible, non-transitory computer-readable media of claim 11, wherein the target band is above or below the reference band and does not overlap the reference band.

18. The tangible, non-transitory computer-readable media of claim 11, wherein for each image classified as an image of the first type of document from one of the plurality of sources, using an object localization algorithm to identity one or more areas of interest in the image further comprises:
   extracting features from the image;
   using a Faster Region-based Convolutional Neural Network (Faster R-CNN) to identify one or more predicted regions based on the extracted features, wherein at least one predicted region spans a width of the image;
   for each predicted region identified via the Faster R-CNN, using a modified Non-Maximum (Non-Max) Suppression procedure to merge any one or more overlapping predicted regions into a single area of interest based at least in part on an Intersection of Union score; and
   cropping the single area of interest from the image.

19. The tangible, non-transitory computer-readable media of claim 11, wherein populating a record associated with the document with the extracted text comprises:
   generating an EDI 835 compliant record based at least in part on the extracted text; and
   identifying a previously-generated EDI 837 compliant record that corresponds to the generated EDI 835 compliant record.

20. A method performed by a computing system, the method comprising:
   receiving a plurality of images of documents;
   for each received image, using an image classification algorithm to classify the image as one of an image of an Explanation of Benefits (EOB) document from one of a plurality of payers or an image of a document other than an EOB document, wherein using the image classification algorithm to classify the image as one of an image of an Explanation of Benefits (EOB) document from one of a plurality of payers or an image of a document other than an EOB document comprises (i) using an autoencoder to generate a feature vector corresponding to the image, (ii) determining a plurality of similarity scores for the image, wherein each similarity score corresponds to a similarity between (a) the feature vector corresponding to the image and (b) a representative feature vector corresponding to one of the plurality of payers, and (iii) classifying the image as corresponding to an EOB document from one of the plurality of payers based at least in part on the plurality of determined similarity scores, wherein classifying the image as corresponding to an EOB document from one of the plurality of payers based at least in part on the plurality of determined similarity scores comprises (a) generating a first classification of the image, wherein the first classification identifies one of the plurality of payers, (b) when the one of the plurality of payers identified in the first classification is consistent with payer information within EDI-837 data corresponding to the image, selecting the first classification as the classification of the image, and (c) when the one of the plurality of payers identified in the first classification is inconsistent with payer information within EDI-837 data corresponding to the image, generating a second classification of the image, wherein the second classification identifies one of the plurality of payers that is different than the payer identified in the first classification;
   for each image classified as an image of an Explanation of Benefits (EOB) document from one of the plurality of payers, using an object localization algorithm to identity an area of interest in the image;
   for an identified area of interest, using an optical character recognition algorithm to extract text from the identified area of interest; and
   populating a record associated with the Explanation of Benefits (EOB) document from one of the plurality of payers with the extracted text.

* * * * *